United States Patent [19]

Heibel

[11] Patent Number: 4,768,631
[45] Date of Patent: Sep. 6, 1988

[54] LOW SENSITIVITY DRUM BRAKE

[75] Inventor: Helmut Heibel, Moschheim, Fed. Rep. of Germany

[73] Assignee: Lucas Industries public limited company, Birmingham, England

[21] Appl. No.: 910,463

[22] Filed: Sep. 23, 1986

[30] Foreign Application Priority Data

Sep. 25, 1985 [DE] Fed. Rep. of Germany ....... 8527385

[51] Int. Cl.$^4$ ............. F16D 51/28; F16D 51/30; F16D 51/48; F16D 51/50
[52] U.S. Cl. ............. 188/327; 188/106 A; 188/334; 188/363
[58] Field of Search ......... 188/325, 331, 333, 106 A, 188/106 F, 79.5 P, 334, 327, 330, 342, 362, 363

[56] References Cited

U.S. PATENT DOCUMENTS

| | | | |
|---|---|---|---|
| 2,122,296 | 6/1938 | Russell | 188/363 X |
| 2,140,385 | 12/1938 | Hunt et al. | 188/106 A |
| 2,144,025 | 1/1939 | LaBrie | 188/106 A |
| 2,161,640 | 6/1939 | Schnell | 188/106 A X |
| 2,206,604 | 7/1940 | Fowler | 180/363 |
| 2,232,308 | 2/1941 | Berglund | 188/334 X |
| 2,280,784 | 4/1942 | Berno | 188/333 X |
| 2,347,599 | 4/1944 | Forbes | 188/363 |
| 3,203,512 | 8/1965 | Lepelletier | 188/331 X |
| 3,554,332 | 1/1971 | Harrison | 188/106 A X |
| 3,581,847 | 6/1971 | Torii et al. | 188/106 F X |
| 3,717,227 | 2/1973 | Rath | 188/79.5 P |
| 3,941,218 | 3/1976 | Torii | 188/331 X |

FOREIGN PATENT DOCUMENTS 10833 2/1981 Japan ............. 188/106 F

Primary Examiner—George E. A. Halvosa
Attorney, Agent, or Firm—Scrivener and Clarke

[57] ABSTRACT

A drum brake comprises two brake shoes (4,5) which are operable hydraulically and/or mechanically. A first brake shoe (4) is supported trailingly in forward travelling direction and leadingly in backward travelling direction. In the forward travelling direction both brake shoes (4,5) are supported trailingly so as to obtain soft response behavior. And a lever (7) is supported at the second brake shoe (5), having one arm pressurized by the piston (2) of the wheel brake cylinder (1), while the other arm (7b) acts directly or indirectly on the first brake shoe (4).

7 Claims, 3 Drawing Sheets

LOW SENSITIVITY DRUM BRAKE

The instant invention relates to a drum brake including at least two brake shoes adapted to be pressurized hydraulically by at least one wheel brake cylinder and/or mechanically for instance by a hand brake, a first brake shoe being supported trailingly in the forward travelling direction and leadingly in backward travelling direction.

The level of the frictional value between the tire and the road sets a limit to braking a vehicle. The best possible use of this given physical limit value under critical braking conditions is afforded if an hydraulic braking system is so designed that the brake predal pressure and, if desired, the power assist of the braking are translated in such manner that the brake pressure acting on the brake shoes will generate a brake torque which approaches the range of the adhesive limit between tire and road.

The instantaneous effective braking couple is a complicated function not only of the hydraulically produced brake load (if desired by an additional brake booster) but also depending on other parameters, such as the geometric dimensions of the frictional surfaces undergoing changes, among others, due to the development of heat upon braking, and the frictional values (coefficient of friction) existing between the brake shoes and the brake drum.

The quotient of the effective peripheral force and of the brake pressure generated hydraulically or mechanically, in general, is referred to as characteristic value "C*". The characteristic value C* thus defined in a function of the coefficient of friction $\mu$ mentioned between the brake shoes and the drum. The gradient of this function $C^*(\mu)$ is called sensitivity $E_0$. Thus the following definition may be applied:

$$E_0 = \frac{dC}{d\mu}.$$

The sensitivity $E_0$ indicates the variation of the characteristic value by the coefficient of friction $\mu$. If the characteristic value is a steeply rising function of the coefficient of friction $\mu$, the resulting sensitivity $E_0$ is great; the brake response is very "hard". The coefficient of friction $\mu$ itself is a function, among others, of the temperature of the frictional surfaces.

In a first approximation the characteristic value is calculated as follows for symmetrical brake shoes:

$$C^* \text{ leading} = \frac{K_1 \times \mu}{K_2 - \mu}$$

$$C^* \text{ trailing} = \frac{K_1 \times \mu}{K_2 + \mu}$$

$K_1$ and $K_2$ are empirical values to be derived from the geometry of the brake shoes and to be considered approximately constant.

It follows from the above equations that the characteristic value C* of a leading brake shoe arrangement is much greater than the characteristic value C* of a trailing brake shoe arrangement.

A high characteristic value C* is needed if a high brake torque is to be generated in drum brakes at low brake pressure. Of course, this requires that also the sensitivity $E_0$ be high. As the corresponding response behavior of the brake is hard, this high sensitivity is not very desirable.

Apart from hydraulic brake actuation, some mechanical actuation of the brake usually is provided as well, embodied by a device usually named hand brake or, more broadly referred to as locking or parking brake because, or course, it may be foot operated as well. For economic reasons such parking brakes normally are designed without any servo units. The muscular force applied by the driver is to be sufficient to initiate the required braking effect.

As a rule, therefore, minor variations of the characteristic value (sensitivities) upon hydraulic braking are desirable, whereas, on the other hand, high sensitivity of the mechanical locking brake may be put up with because then it will be easy to reach a high characteristic value C* providing a relatively high brake torque at a given maximum brake pressure.

It is an object of the instant invention to provide a drum brake which has a relatively soft response behavior upon hydraulic brake actuation in the forward travelling direction and which reaches a high brake torque during mechanical brake application. It is another object of the instant invention to provide a drum brake of simple structure which moreover will permit manufacture at reasonable cost.

These objects are met, in accordance with the invention, in that upon braking in forward travelling direction none of the brake shoes is supported leadingly and self-boosting and in that a lever is pivoted at the second brake shoe and has its one arm pressurized by the piston of the wheel brake cylinder, while its other arm acts directly or indirectly on the first brake shoe.

Advantageous modifications of the invention are specified in the subclaims.

In accordance with the invention none of the brake shoes acts leadingly upon ordinary application of the brakes in forward travelling direction. For this reason the brake displays a rather soft response behavior (in other words it has a relatively low sensitivity in the sense of the definitions given above). However, the second brake shoe at which the lever is pivoted is pressed against the drum at twice the force of the wheel brake cylinder so that, on the whole, the braking effect obtained is sufficient.

The sensitivity of the brake according to the invention is comparatively low. If the brakes are applied in forward travelling direction at a brake pressure of about 40 bars, the resulting characteristic value will be about 1.23.

If the brakes are applied in the backward travelling direction, one of the brake shoes will be leading and running up and the self-boosting effect of friction will provide a characteristic value of 3.0.

The characteristic value achieved by the brake according to the invention upon application of the mechanical brake in forward travelling direction is approximately 2.4, while it is approximately 2.5 if the mechanical brake is applied in the backward travelling direction.

It is another advantage of the brake according to the invention that it is little dependent on temperature. The characteristic value varies no more than approximately ±13.8% for a temperature range of from 0° to 300° C. The usual simplex brake, on the other hand, suffers variations of ±30% for the same temperature range.

The invention will be described further, by way of example, with reference to the accompanying drawings, in which.

Figure 1:
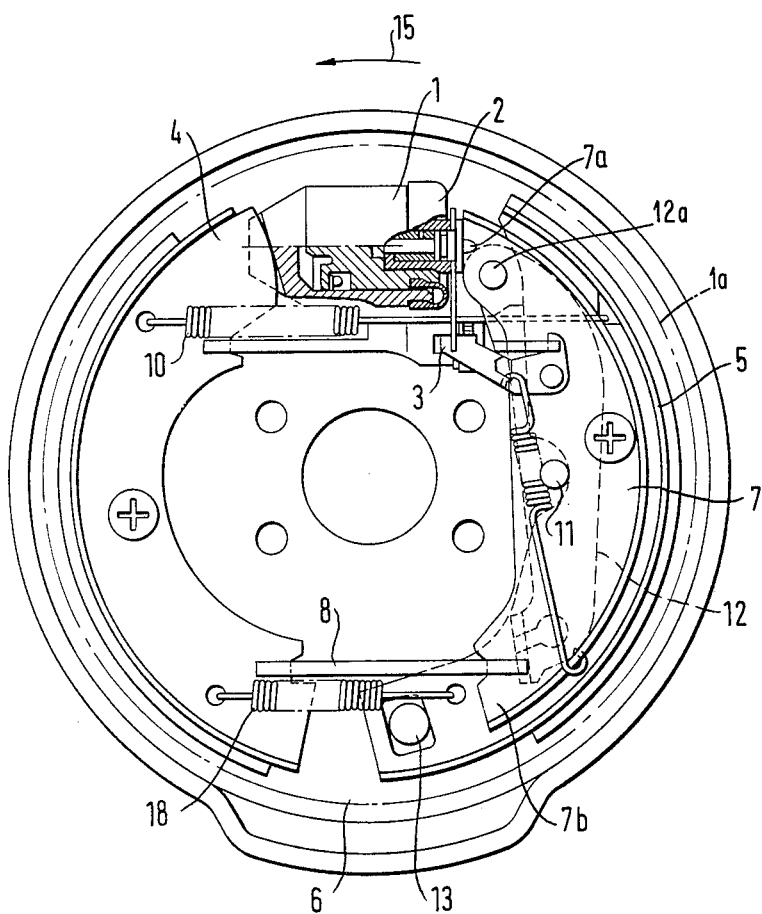
FIG. 1 is a diagrammatic presentation of a drum brake.

As shown in FIG. 1, a wheel cylinder 1 (wheel brake cylinder) of a drum brake (the drum of which is indicated by the phantom line 1a) pressurizes a piston 2 to effect application of first and second shoes 4 and 5 to the drum 1a. The first brake shoe 4 is pressed in per se known manner by a pin/spring connection (not shown) against a backplate 6. A known adjusting device 3 is effective between the two brake shoes 4 and 5 so as to increase the spacing between the two brake shoes in accordance with the wear of the friction linings. The forward direction is indicated by arrow 15.

A lever 7 is pivoted intermediate its ends 7a and 7b by a pin 11 to the shoe 5 which, in turn, is pivoted at one end to a fixed pivot 13. The end 7a of the lever 7 abuts the piston 2 of the brake cylinder 1 and the other end 7b of the lever 7 engages one end of a pressure rod 8 whose opposite end engages one end of the brake shoe 4.

The brake is actuated mechanically by provision of the customary hand or foot brake lever 12 which is pivotally fastened at 12a to the lever 7. The hand or foot brake lever 12 is not the component part directly operated by the driver but instead the structural member which translates the mechanical force directly at the brake. Mechanical brakes of the most varied kind may be used together with the drum brake as illustrated in FIG. 1, especially rocking lever arrangements or tension-type brakes. Between brake shoes 4, 5 a further spring 18 is provided being located opposite to spring 10.

Hydraulic actuation of the brake in the forward direction of the arrow 15 will cause the piston 2 of the wheel brake cylinder 1 to act on the abutting end 7a of the lever 7 so as to swing the lever 7 about the pin 11, the lever 7 at its other end 7b pressing the pressure rod 8 toward the first brake shoe 4 which thus is pressed against the brake drum (not shown). The forces of the piston 2 and the reaction of shoe 4 on rod 8 acting on the lever 7 are transmitted by the pin 11 to the second brake shoe 5 which is now pressed into engagement with the brake drum. The brake pressures on both shoes are transmitted by the brake shoe 5 to the stop 13 fixed to the backplate 6. The brake shoe 4 acts as a trailing brake shoe, while the brake shoe 5 acts in a manner similar to a disc brake pad subjected to twice the actuating force. The braking factor achieved upon application of the brakes in forward travelling direction is approximately 1.23 at 40 bars.

When the brakes are applied in the backward travelling direction, the first brake shoe 4 is leading and self-boosting and has a braking factor of 3.0.

The braking factors are rather high also when applying the mechanical brake: If the mechanical brake is actuated, such as the hand brake, when the travelling direction is forward, the brake shoe 4 is pressed against the drum in the conventional manner by the pressure rod of the adjusting device 3, while the second brake shoe 5 is pressed against the drum by the lever 7 and the pressure rod 8. The braking factor thus obtained is 2.4. During movement in the backward travelling direction a braking factor of 2.5 was measured.

Figure 2:
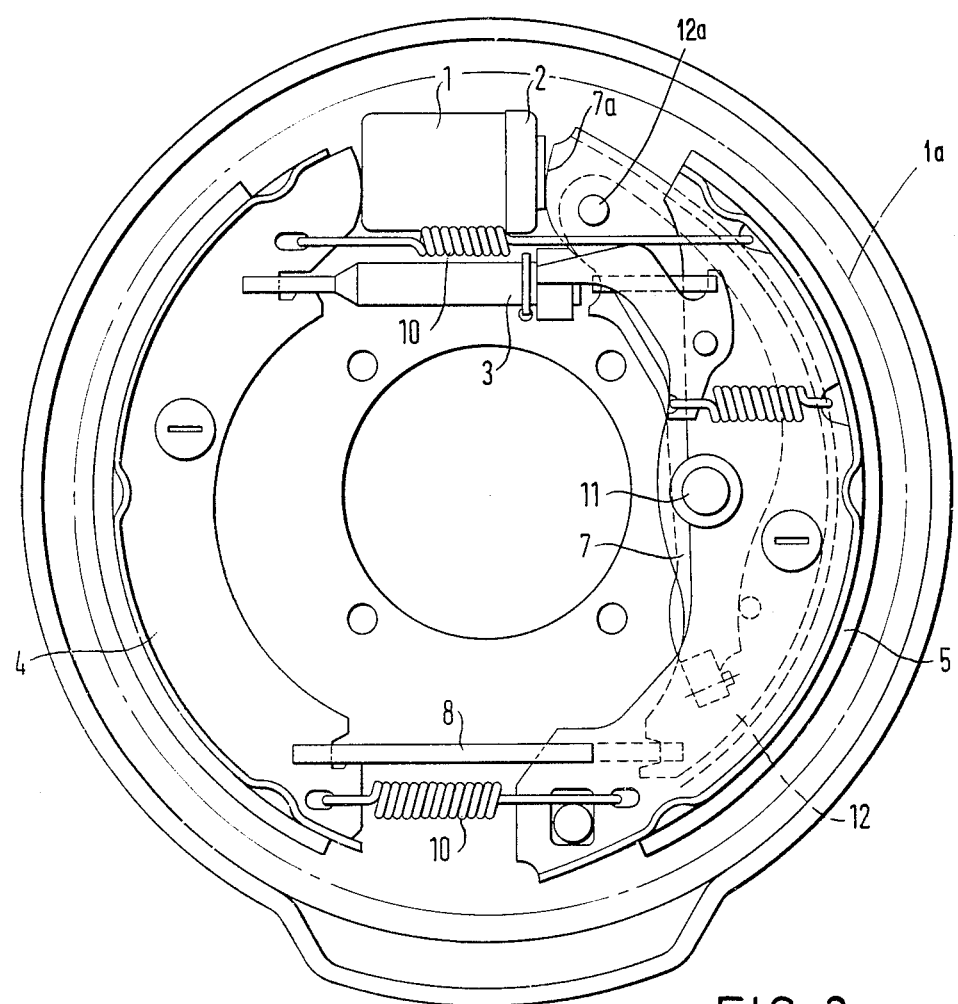
FIG. 2 is another embodiment of a drum brake.
Figure 3:
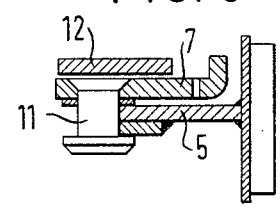
FIGS. 3 and 4 are horizontal sectional views of details of FIG. 2.
Figure 4:
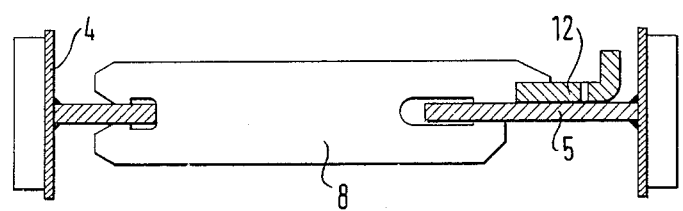

FIGS. 2, 3, and 4 show another embodiment which corresponds to the one presented in FIG. 1 with the exception of the adjusting device 3 which in this case is embodied without load responsive lock. FIG. 3 is a sectional view showing a detail of FIG. 2 at the level of the pin 11. The lever 7 is supported for rotation on the brake shoe 5 by means of the pin 11 and the hand or foot brake lever 12, on the other hand, is connected to the lever 7.

FIG. 4 is a horizontal sectional elevation taken at the level of the pressure rod 8 which is subjected to the action of both the lever 7 and the hand or foot brake lever 12.

Figure 5:
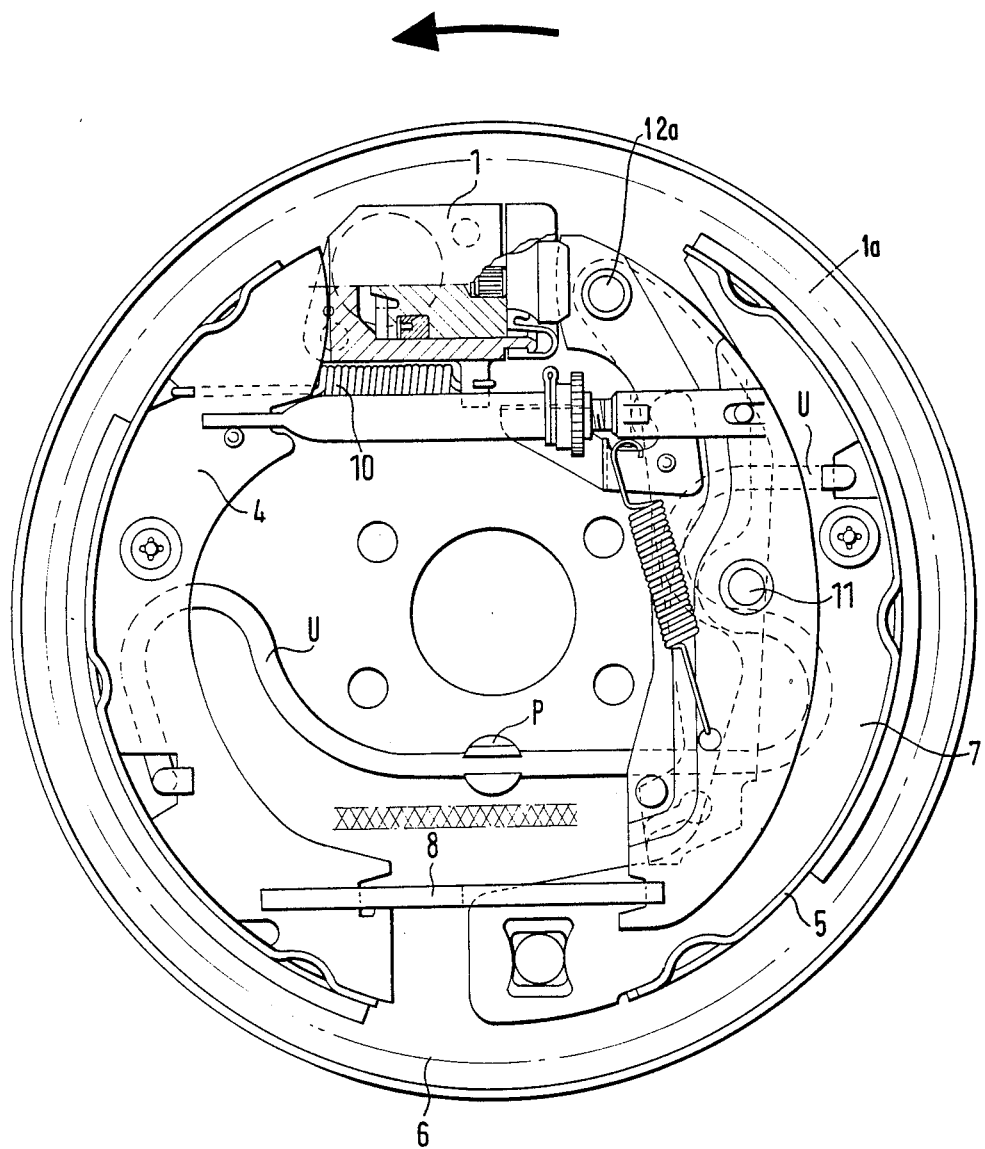
FIG. 5 is another embodiment of a drum brake.

In FIG. 5 another embodiment of a drum brake in accordance with the invention is shown. Those parts which correspond to the embodiment as described above have the same reference numerals. The embodiment according to FIG. 5 is distinguished over the embodiment shown in FIG. 1 by an additional U-spring U which urges the brake shoes 4, 5 inwardly in order that the two brake shoes are safely retracted from the drum. The U-spring U is fixed on the brake by means of a plug P. The plug P is made of plastics.

Furthermore, the embodiment according to FIG. 5 is distinguished over the embodiment according to FIG. 1 in that the pin 11 is completely surrounded by the lever 7, i.e. pin 11 provides a complete bearing for lever 7. The U-spring U engages the brake shoes 4, 5 at diametrically opposed points such that the connecting line between the two points of engagement crosses at least approximately the center of the brake.

What is claimed is:

1. A drum brake comprising a drum and at least a first and second brake shoe (4, 5) a wheel brake cylinder (1) having a piston for hydraulically actuating said brake, none of said brake shoes (4, 5), upon braking in forward travelling direction, being supported leadingly and self-boosting, said first brake shoe (4), upon braking in backward travelling direction being supported leadingly and self-boosting, a lever (7) pivotally connected intermediate its ends to said second brake shoe and having two arms (7a, 7b) one of said arms (7a) abutting against and being movable by said piston of said wheel brake cylinder (1) whereas the other arm (7b) acts on said first brake shoe (4) via a pressure transfer element (8), said piston acting only on said lever, said lever urging the second brake shoe (5) against the drum in response to movement of said piston against said one arm (7a) and the reaction of said other arm (7b) against said pressure transfer element (8) upon engagement of said first shoe with said drum.

2. A drum brake according to claim 1, wherein said lever (7) is pivoted at said second brake shoe (5) by a pin (11) which pin is arranged at least approximately symmetrically with respect to the second brake shoe.

3. A drum brake as claimed in claim 1, wherein the ratio of the first and second arms (7a, 7b) of the lever with respect to each other is 1:1.

4. A drum brake as claimed in claim 1, wherein a mechanical brake actuator, such as a hand brake, is provided comprising a brake-lever (12) which is pivoted at said lever (7) and acts on said first brake shoe (4).

5. A drum brake as claimed in claim 4, wherein said brake-lever (12) acts through said pressure transfer element (8) on said first brake shoe (4) which is leading in backward travelling direction.

6. The drum brake as claimed in claim 1, wherein a spring (U) is provided which is generally U-shaped and which urges said brake shoes (4, 5) away from the drum.

7. The drum brake of claim 1, including a fixed stop (13) engaged by the second brake shoe (5) and to which the brake pressures are transmitted by the brake shoe (5).

* * * * *